(12) United States Patent
Tsukamoto et al.

(10) Patent No.: US 7,469,537 B2
(45) Date of Patent: Dec. 30, 2008

(54) HYDRAULIC TRANSAXLE AND HYDRAULICALLY DRIVEN VEHICLE

(75) Inventors: Michio Tsukamoto, Amagasaki (JP); Norihiro Ishii, Amagasaki (JP); Hideaki Okada, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 207 days.

(21) Appl. No.: 11/502,545

(22) Filed: Aug. 11, 2006

(65) Prior Publication Data
US 2007/0186550 A1 Aug. 16, 2007

(30) Foreign Application Priority Data
Aug. 17, 2005 (JP) .............................. 2005-236546

(51) Int. Cl.
*F16D 31/02* (2006.01)
(52) U.S. Cl. .......................................... 60/468; 60/328

(58) Field of Classification Search ................... 60/328, 60/468, 489, 494; 91/489, 503
See application file for complete search history.

(56) References Cited

U.S. PATENT DOCUMENTS

| | | | |
|---|---|---|---|
| 6,145,312 A * | 11/2000 | Hauser et al. .................. | 60/487 |
| 6,651,427 B1 * | 11/2003 | Poplawski et al. ............. | 60/494 |
| 6,732,828 B1 * | 5/2004 | Abend et al. ................. | 180/307 |
| 6,735,943 B1 | 5/2004 | Hauser et al. | |
| 6,845,837 B2 | 1/2005 | Ohashi et al. | |

OTHER PUBLICATIONS

European Search Report and Search Opinion for EP Appl. No. 06 01 6973, European Patent Office, mailed Oct. 15, 2008, 6 pages.

\* cited by examiner

*Primary Examiner*—Michael Leslie
(74) *Attorney, Agent, or Firm*—Sterne, Kessler, Goldstein & Fox P.L.L.C.

(57) ABSTRACT

A hydraulic transaxle comprises: an axle; a hydraulic pump driven by a prime mover; a hydraulic motor fluidly connected to the hydraulic pump so as to drive the axle; a bypass fluid circuit bypassing between suction and delivery ports of the hydraulic motor; a bypass valve provided in the bypass fluid circuit; a bypass operation device for selectively opening or closing the bypass valve; and a reset mechanism for closing the opened bypass valve.

8 Claims, 13 Drawing Sheets

(a)

(b)

HYDRAULIC TRANSAXLE AND HYDRAULICALLY DRIVEN VEHICLE

BACKGROUND OF THE INVENTION

1. Field of the Invention

The invention relates to a hydraulic transaxle including a hydraulic motor for driving an axle, provided with a bypass valve bypassing between suction and delivery ports of the hydraulic motor, and relates to a hydraulically driven vehicle equipped with one or more hydraulic motors for driving an axle or respective axles, and provided with one or more bypass valves each of which bypasses between suction and delivery ports of each of the hydraulic motors.

2. Related Art

As disclosed in U.S. Pat. Nos. 6,732,828 and 6,845,837, there is a conventional, well-known hydraulically driven vehicle equipped with respective hydraulic motors for front and rear axles. The hydraulic motors are provided with respective bypass valves each of which is to be opened for bypassing fluid between the suction and delivery ports of each of the hydraulic motors. When the vehicle is hauled, an operator performs the operation for opening the bypass valves so as to bypass fluid between the suction and delivery ports of each of the hydraulic motors and drain the fluid to a fluid sump, thereby allowing the hydraulic motors to act as pumps driven by the rotating axles regardless of a hydraulic pump fluidly connected to the hydraulic motors. The operation for opening the bypass valves is also performed for fluid connection of hydrostatic transaxles including the respective hydraulic motors or for releasing air during exchanging of fluid.

However, it may happen that an operator forgets to close one or more of the bypass valves after the need for opening the bypass valves has passed. Unclosed bypass valves cause inactivation of the corresponding hydraulic motor, thereby resulting in unstable travel of the vehicle because of a difference in rotary speed between the front and rear axles. Further, in the case that the hydraulic motors are fluidly connected to the hydraulic pump in series and the bypass valve of the upstream hydraulic motor is not closed, the downstream hydraulic motor is also inactivated, i.e., both of the hydraulic motors are inactivated, whereby the vehicle cannot travel.

Further, during traveling of the vehicle, an unclosed bypass valve causes insufficient dynamic braking action of the hydraulic pressure of the fluid delivered from the hydraulic pump, thereby preventing the vehicle from being properly decelerated or braked.

Further, the fluid drained from an unclosed bypass valve increases pressure of the fluid sump in a transaxle housing incorporating the corresponding hydraulic motor, thereby causing leakage of the fluid from the transaxle housing. Consequently, in the past the transaxle housing has been expensively sealed against such an unexpected leak of fluid.

SUMMARY OF THE INVENTION

A first object of the invention is to provide a hydraulic transaxle safe from the problems caused by not closing a bypass valve of a hydraulic motor for driving an axle.

To achieve the first object of the invention, a transaxle according to a first aspect of the present invention comprises: an axle; a hydraulic pump driven by a prime mover; a hydraulic motor fluidly connected to the hydraulic pump so as to drive the axle; a bypass valve to be opened for bypassing fluid between suction and delivery ports of the hydraulic motor; a bypass operation device for selectively opening or closing the bypass valve; and a reset mechanism operatively connected to the bypass operation device so as to automatically close the bypass valve when the bypass valve is not closed.

Therefore, even if the bypass operation device has been operated for opening the bypass valve, but has been forgotten to be operated for closing the bypass valve before traveling of a vehicle equipped with the transaxle, i.e., even if the bypass valve is not closed before traveling of the vehicle, the reset mechanism forcibly closes the unclosed bypass valve so as to ensure proper travel of the vehicle. That is, the transaxle performs proper output rotation and proper dynamic braking action of the hydraulic motor during traveling of the vehicle. Further, with respect to a transaxle housing incorporating the hydraulic motor, the closing of the bypass valve by the reset mechanism prevents a volumetric increase of fluid drained from the bypass valve, thereby preventing fluid from leaking from the transaxle housing, and thereby reducing costs for ensuring the anti-pressure property of the transaxle housing.

Preferably, the reset mechanism is activated to close the unclosed bypass valve according to an operation required for starting the prime mover. Therefore, the bypass is surely closed before starting the prime mover. The operation required for starting the prime mover is, for instance, a braking operation (depression of a brake pedal), an operator sitting on a seat, or a clutch-off operation of a working device.

Preferably, the reset mechanism is activated to close the unclosed bypass valve according to an operation required for the traveling of a vehicle after starting the prime mover. Therefore, the bypass valve is surely closed during travel of the vehicle even after starting the prime mover. The operation required for traveling of the vehicle after starting the prime mover is, for instance, an operation for acceleration of the vehicle (depression of a speed changing pedal), i.e., an operation for increasing the displacement of the hydraulic pump.

Preferably, the hydraulic transaxle further comprises a drain passage connected to the bypass valve, and the reset mechanism is activated according to an increase of hydraulic pressure in the drain passage. This reset mechanism uses an increase of hydraulic pressure in the drain passage necessarily caused by opening the bypass valve. Therefore, the reset mechanism requires no complicated linkage for associating another operation device with the bypass operation device. Further, the reset mechanism can be assembled together with the hydraulic motor.

Preferably, the hydraulic transaxle further comprises a warning device for warning when it is detected that the bypass valve is opened. Therefore, even if the bypass valve remains unclosed regardless of the reset mechanism (for instance, because of trouble of the reset mechanism), an operator is alarmed at the warning by the warning device and operates the bypass operation device so as to reset (close) the unclosed bypass valve.

A second object of the invention is to provide a hydraulically driven vehicle safe from the problems caused by not closing any of the bypass valves of respective hydraulic motors for driving respective axles.

To achieve the second object of the invention, a hydraulically driven vehicle according to a second aspect of the invention comprises: a plurality of axles; a prime mover; a hydraulic pump driven by the prime mover; a plurality of hydraulic motors fluidly connected to the hydraulic pump so as to drive the respective axles; a plurality of bypass valves each of which is to be opened for bypassing fluid between suction and delivery ports of each of the hydraulic motors; a plurality of bypass operation devices for selectively opening or closing the respective bypass valves; and a reset mechanism operatively connected to the bypass operation devices so as to automatically close any unclosed one of the bypass valves.

Therefore, even if any of the bypass operation devices has been operated for opening the bypass valve, but has been forgotten to be operated for closing the bypass valve before traveling of the vehicle, i.e., even if any of the bypass valves is not closed before the traveling of the vehicle, the reset mechanism forcibly closes the unclosed bypass valve, i.e., closes all the bypass valves so as to ensure proper travel of the vehicle. That is, the vehicle can travel with proper output rotation and proper dynamic braking action of the hydraulic motors. Further, with respect to a transaxle housing (or transaxle housings) incorporating the hydraulic motors, the closing of the bypass valves by the reset mechanism prevents a volumetric increase of fluid drained from the bypass valves, thereby preventing fluid from leaking from the transaxle housing(s), and thereby reducing costs for ensuring the anti-pressure property of the transaxle housing(s).

Preferably, the reset mechanism is activated so as to close any unclosed one of the bypass valves according to an operation required for starting the prime mover. Therefore, all of the bypass valves are surely closed before starting of the prime mover. The operation required for starting the prime mover is, for instance, a braking operation (depression of a brake pedal), an operator sitting on a seat, or a clutch-off operation of a working device.

Preferably, the reset mechanism is activated so as to close any unclosed one of the bypass valves according to an operation required for the traveling of the vehicle after starting the prime mover. Therefore, all of the bypass valves are surely closed during travel of the vehicle even after starting the prime mover. The operation required for the traveling of the vehicle after starting the prime mover is, for instance, an operation for acceleration of the vehicle (depression of a speed changing pedal), i.e., an operation for increasing the displacement of the hydraulic pump.

Preferably, the hydraulically driven vehicle further comprises drain passages connected to the respective bypass valves, and the reset mechanism is activated so as to close any unclosed one of the bypass valves according to an increase of hydraulic pressure in any of the drain passages. This reset mechanism uses an increase of hydraulic pressure in the drain passage necessarily caused by opening the bypass valve. Therefore, the reset mechanism requires no complicated linkage for associating another operation device with the bypass operation devices. Further, the reset mechanism can be divided and assembled together with the respective hydraulic motors.

Preferably, the hydraulically driven vehicle further comprises a warning device for warning when it is detected that any of the bypass valves is opened. Even if any of the bypass valves remains unclosed regardless of the reset mechanism, an operator is alarmed at the warning by the warning device.

These, further and other objects, features and advantages will appear more fully from the following description with reference to the accompanying drawings.

BRIEF DESCRIPTION OF THE DRAWINGS

FIG. 5 illustrates an automatic reset mechanism for a bypass valve of the hydraulic motor, wherein FIG. 5(a) is a plan view of a bypass operation arm, and FIG. 5(b) is a sectional side view of the hydraulic motor with the bypass valve and the reset mechanism.

DETAILED DESCRIPTION OF THE INVENTION

Figure 1:
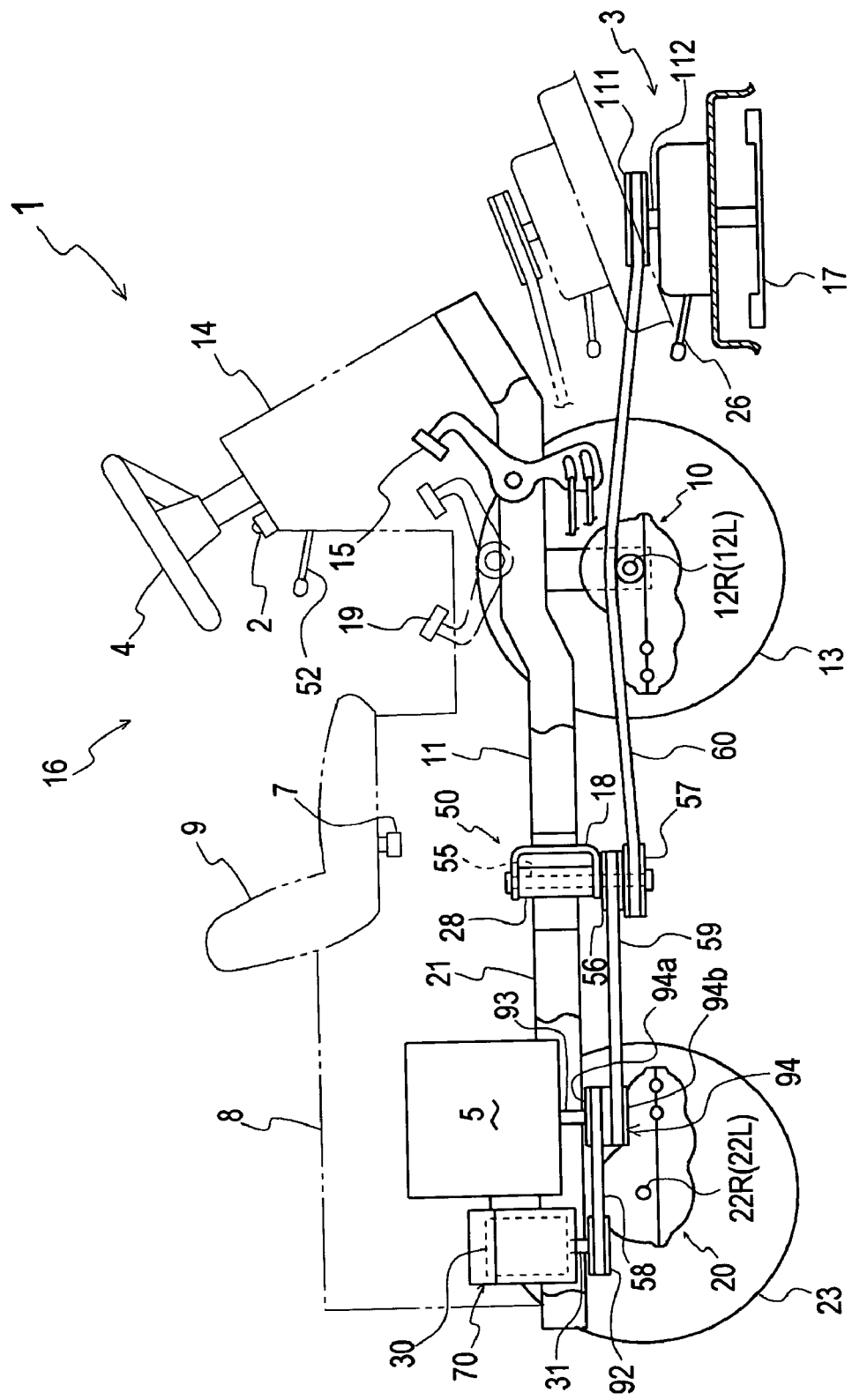
FIG. 1 is a side view partly in section of a riding lawn mower as an embodiment of the hydraulically driven vehicle according to the present invention.
Figure 2:
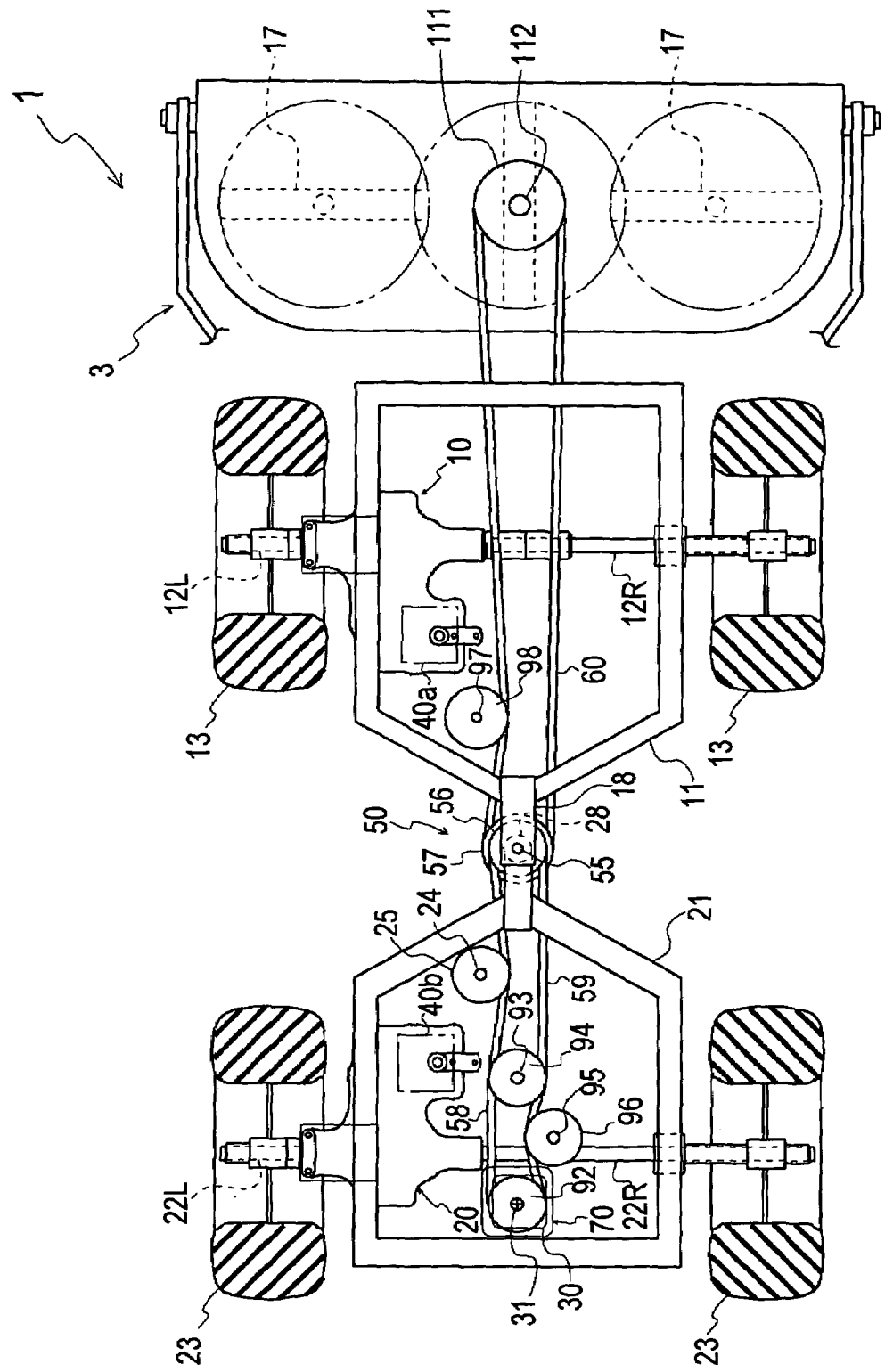
FIG. 2 is a plan view partly in section of the vehicle showing a power train.
Figure 3:
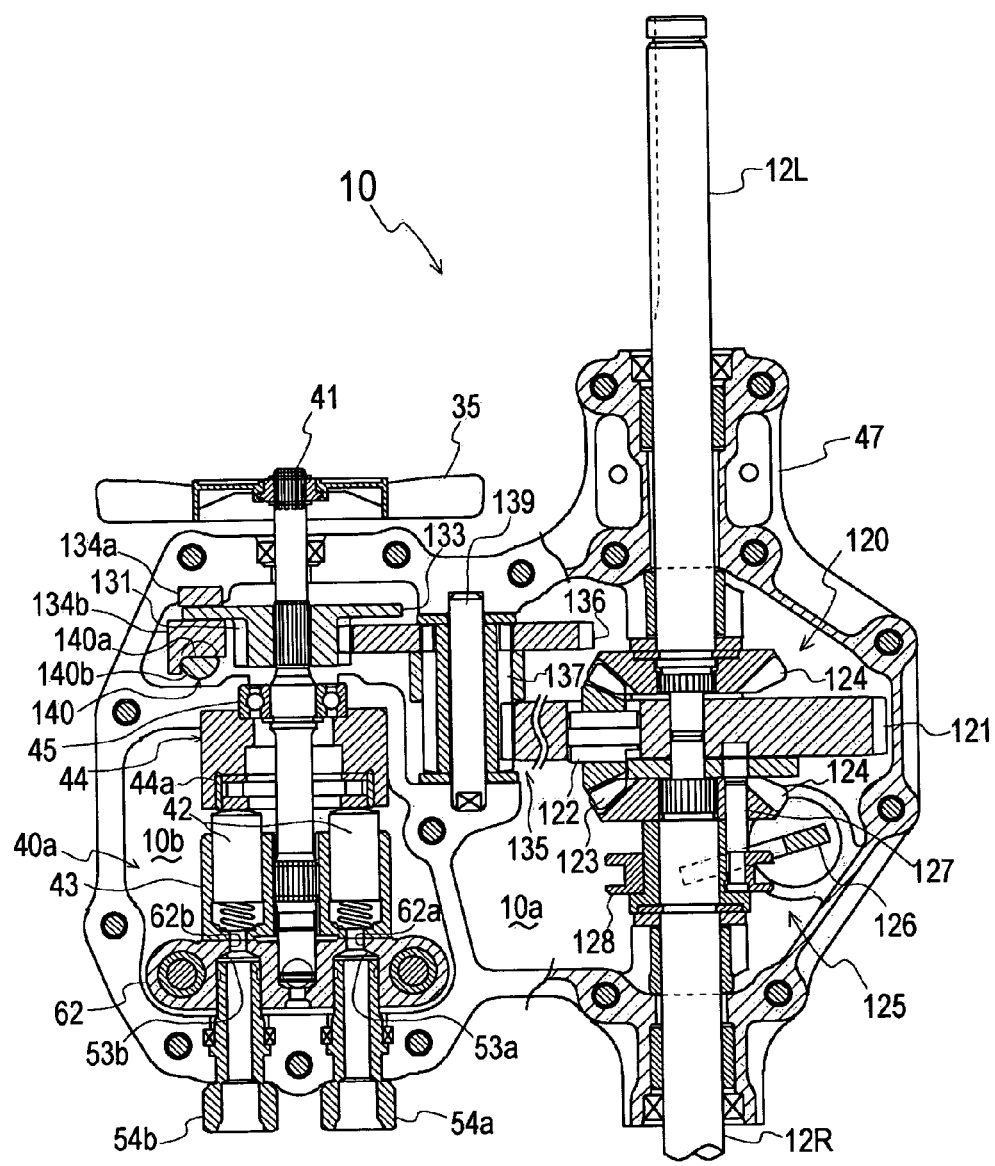
FIG. 3 is a plan view of a front transaxle used for the vehicle, from which an upper housing part is removed.

Description will be given of a general structure of a vehicle 1 shown in FIGS. 1 and 2, which is a riding lawn mower serving as an embodiment of a hydraulically driven vehicle according to the invention. Vehicle 1 includes a front frame 11 and a rear frame 21, and is equipped with a vertically movable mower unit 3, serving as a working device, disposed in front of front frame 11. Mower unit 3 is provided with a mower clutch lever 26 for clutching on/off the power transmission to rotary blades 17 in mower unit 3.

A rear end coupling portion 18 of front frame 11 and a front end coupling portion 28 of rear frame 21 are articulately connected to each other through a vertical pivot shaft 55, so as to constitute a coupling 50. Front frame 11 supports a front transaxle 10 and journals left and right front axles 12L and 12R extended from front transaxle 10. Front wheels 13 are fixedly connected onto distal ends of front axles 12L and 12R disposed on left and right outsides of front frame 11. Rear frame 21 supports a rear transaxle 20 and journals left and right rear axles 22L and 22R extended from rear transaxle 20. Rear wheels 23 are fixedly connected onto distal ends of rear axles 22L and 22R disposed on left and right outsides of rear frame 21.

A bonnet 8 and an engine 5 (alternatively, an electric motor) enclosed by bonnet 8 are mounted on rear frame 21, and rear transaxle 20 is disposed below engine 5. A front column 14, a steering wheel 4, a brake pedal 15 and a speed changing pedal 19 are mounted on a front portion of front frame 11, and a driver's seat 9 is mounted on a rear portion of front frame 11, so as to constitute a driver's section 16 above front frame 11. A bypass operation lever 52 projects from front column 14, and a warning device 2 is provided on front column 14. A front end portion of bonnet 8 is relatively rotatably fitted to driver's seat 9 so as to correspond to the articulated connection of front and rear frames 11 and 21.

A power train of vehicle 1 will be described with reference to FIGS. 1 and 2. Front transaxle 10 incorporates a hydraulic motor 40a for driving front axles 12L and 12R. Rear transaxle 20 incorporates a hydraulic motor 40b for driving rear axles 22L and 22R. Two symmetric transaxles serve as front and rear transaxles 10 and 20. Otherwise, the same transaxle may serve as either front transaxle 10 or rear transaxle 20. A pump housing 70 incorporates a hydraulic pump 30 for supplying fluid to hydraulic motors 40a and 40b, and is supported by rear frame 21.

A vertical engine output shaft 93 projects downward from engine 5 so as to be fixedly provided thereon with a double engine output pulley 94 consisting of an upper pulley 94a and a lower pulley 94b. A vertical pump shaft 31 of hydraulic pump 30 projects downward from pump housing 70 so as to be fixedly fitted thereon with an HST (hydrostatic transmission) input pulley 92. Vertical support shafts 24 and 95 are hung down from rear frame 21 and relatively rotatably provided thereon with respective idle rollers 25 and 96. A mower input shaft 112 projects upward from mower unit 3 so as to be fixedly provided thereon with a mower input pulley 111. A vertical support shaft 97 is hung down from front frame 11 so as to be relatively rotatably fitted thereon with an idle roller 98. Vertical pivot shaft 55 is extended downward so as to be relatively rotatably fitted thereon with an upper input pulley 56 and a lower output pulley 57.

A first belt 58 is looped over upper pulley 94a, idle roller 96 and HST input pulley 92. A second belt 59 is looped over lower pulley 94b, idle roller 25 and upper input pulley 56. A third belt 60 is looped over lower output pulley 57, idle roller 98 and mower input pulley 111. First belt 58 transmits the power of engine 5 from engine output shaft 53 to pump shaft 31, so as to drive hydraulic pump 30. Simultaneously, second and third belts 59 and 60 transmit power of engine 5 from engine output shaft 93 to mower input shaft 112, so as to drive rotary blades 17 in mower unit 3. In mower unit 3, a clutch operated by mower clutch lever 26 is interposed between mower input shaft 112 and rotary blades 17.

Representative front transaxle 10 will be described with reference to FIGS. 3 to 6. Since front and rear transaxles 10 and 20 are supposed to be symmetric, description of rear transaxle 20 is omitted. Especially, in FIG. 6, the same components of rear transaxle 20 as those of front transaxle 10 are designated by the same reference numerals.

An upper housing part 46 and a lower housing part 47 are joined to each other through a horizontal joint surface so as to constitute a transaxle housing of front transaxle 10 incorporating hydraulic motor 40a. An inner space of the transaxle housing is divided into a gear chamber 10a and a motor chamber 10b. Motor chamber 10b incorporates hydraulic motor 40a. Gear chamber 10a incorporates a differential gear unit 120 and a deceleration gear train 135 for transmitting power from hydraulic motor 40a to differential gear unit 120.

A center section 62 is disposed in motor chamber 10b. A cylinder block 43 of hydraulic motor 40a is slidably rotatably fitted onto a vertical motor mounting surface 63 formed on center section 62. Pistons 42 are reciprocally fitted into cylinder block 43 and abut at heads thereof against a thrust bearing 44a of a fixed swash plate 44 clamped between upper and lower housing parts 46 and 47, and cylinder block 43 is relatively unrotatably spline-fitted on a horizontal axial motor shaft 41, thereby constituting axial piston type fixed displacement hydraulic motor 40a. Motor shaft 41 is relatively rotatably fitted at one end thereof into center section 62. Motor shaft 41 projects outward from cylinder block 43 opposite to center section 62, so as to be freely rotatably passed through a central opening 44b of fixed swash plate 44, and journalled by upper and lower housing parts 46 and 47 through a bearing 45.

Figure 4:
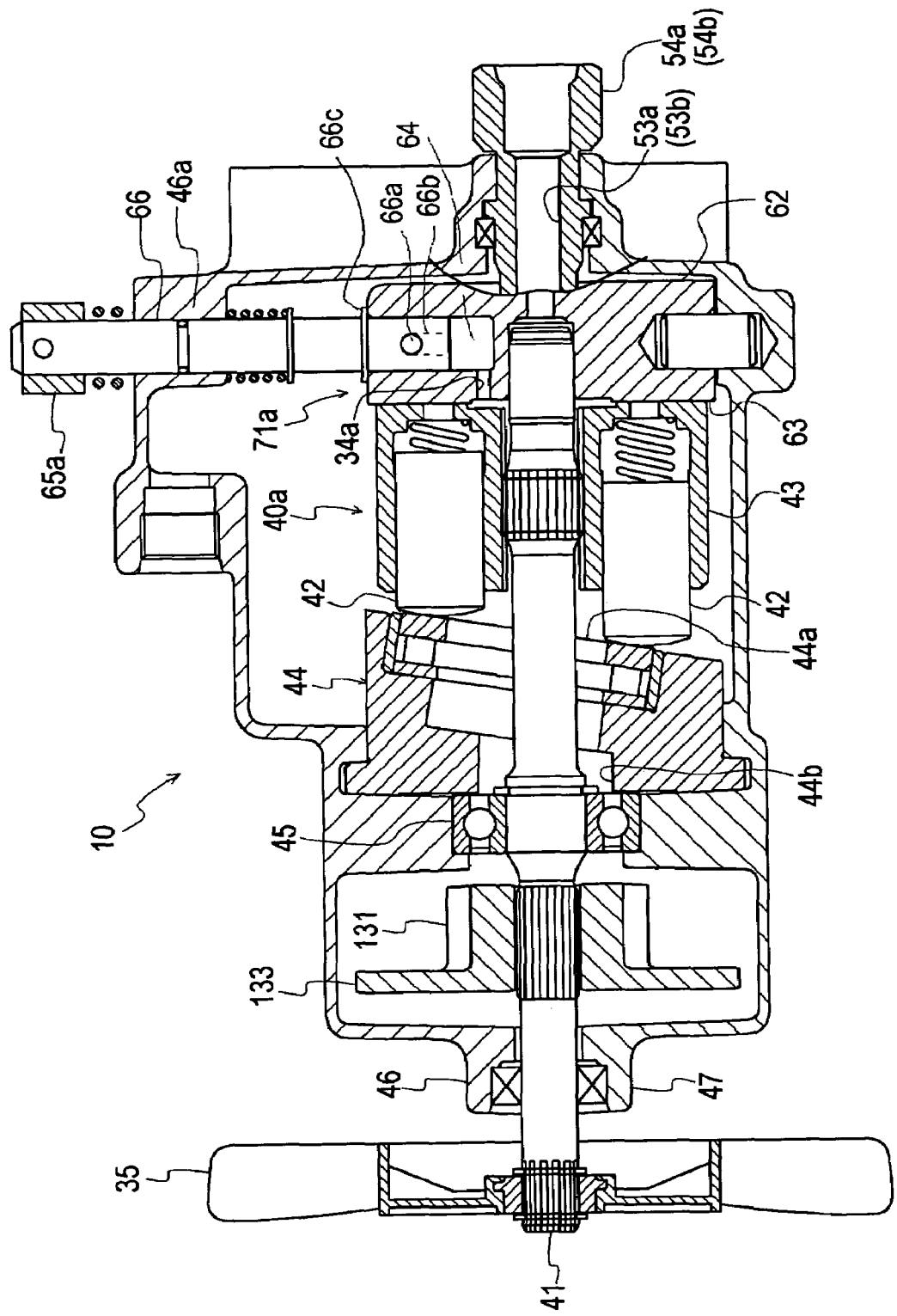
FIG. 4 is a sectional rear view of the transaxle showing a hydraulic motor therein.

As shown in FIG. 5(b), center section 62 is bored with two kidney ports 62a and 62b serving as suction and delivery ports of hydraulic motor 40a. As shown in FIGS. 4 and 5(b), two port members 54a and 54b are clamped between upper and lower housing parts 46 and 47 and fitted into center section 62. Port members 54a and 54b have respective axial penetrating ports 53a and 53b, which are opened to respective kidney ports 62a and 62b. Hydraulic pressure fluid pipes are extended from pump housing 70 and rear transaxle 20 and connected to port members 54a and 54b so as to constitute a main HST closed circuit 36 which fluidly connects hydraulic motors 40a and 40b to hydraulic pump 30 in series. A hydraulic circuit 78 including main HST closed circuit 36 will be described later with reference to FIG. 6.

In front transaxle 10, center section 62 is formed therein with a bypass passage 33 bypassing between kidney ports 62a and 62b, i.e., between suction and delivery ports of hydraulic motor 40a. A bypass valve 71a is provided on the midway of bypass passage 33, and operatively connected to a bypass operation arm 65a so as to be selectively opened or closed by operating bypass operation arm 65a.

More specifically, referring to FIGS. 4 and 5(b), center section 62 is bored therein with vertical holes 33a and 33b and a horizontal hole 33c, serving as bypass passage 33. Vertical holes 33a and 33b are opened to respective kidney holes 62a and 62b. Horizontal hole 33c is interposed between vertical holes 33a and 33b. An upwardly opened vertical shaft hole 64 is bored in center section 62 on the midway of horizontal hole 33c. A vertical bypass valve shaft 66 is relatively rotatably inserted downward into shaft hole 64.

A ceiling wall of upper housing part 46 is formed with a boss 46a through which bypass valve shaft 66 is relatively rotatably passed. A flange 88 is peripherally formed on bypass valve shaft 66 below boss 46a in the transaxle housing of front transaxle 10, and a spring 89 is wound around bypass valve shaft 66 between a bottom surface of boss 46a and flange 88, so as to bias bypass valve shaft 66 downward. A flange 66c is peripherally formed on bypass valve shaft 66 below flange 88 and slidably rotatably pressed against a top surface of center section 62 so as to prevent bypass valve shaft 66 from falling.

Figure 6:
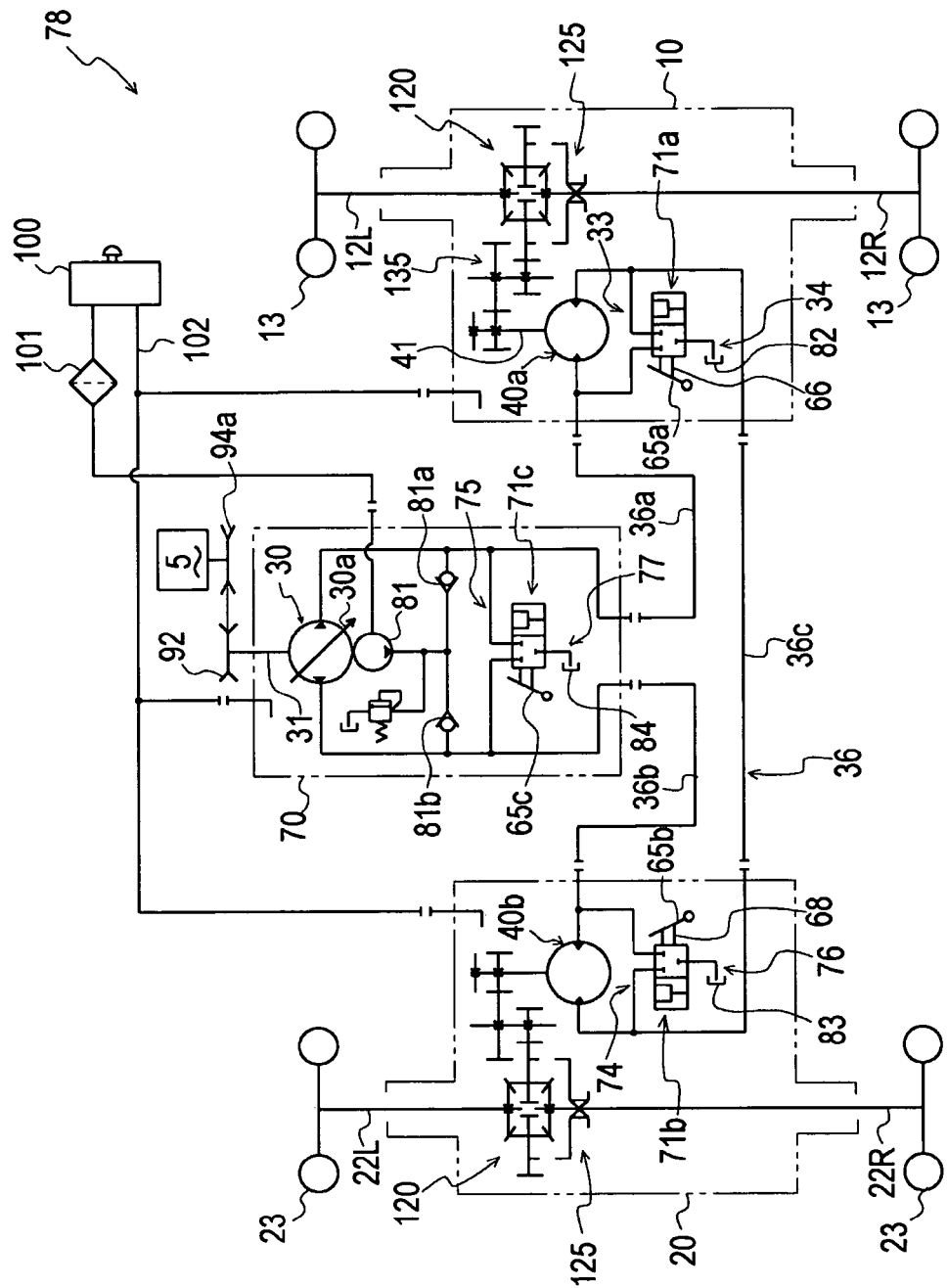
FIG. 6 is a hydraulic circuit diagram for driving the vehicle.

A drain hole 34a is opened into a chamber of shaft hole 64 below a bottom end of bypass valve shaft 66 fitted in shaft hole 64, and opened outward from center section 62 to a fluid sump 82 (see FIG. 6) in the transaxle housing of front transaxle 10, thereby constituting a drain passage 34 (see FIG. 6). A lower portion of bypass valve shaft 66 below flange 66c, serving as a rotary type bypass valve 71a, is bored with a horizontally diametrically penetrating bypass valve hole 66a, and with a vertical drain hole 66b extended downward from a middle portion of bypass valve hole 66a and downwardly opened to the chamber of shaft hole 64 below bypass valve shaft 66.

A bypass operation arm 65a is fixed on a top end of bypass valve shaft 66 projecting upward from boss 46a. As shown in FIG. 5(a), bypass operation arm 65a is switchable between a closed valve position 73 and an opened valve position 72.

When bypass operation arm 65a is disposed at opened valve position 72, bypass valve shaft 66 rotatably integrated with bypass operation arm 65a is disposed so as to orient horizontal bypass valve hole 66a coaxially to horizontal hole 33c of bypass passage 33, i.e., to open bypass valve hole 66a to horizontal hole 33c. In this way, opened bypass valve 71a wholly opens bypass passage 33 so as to bypass fluid through bypass passage 33 between kidney ports 62a and 62b (i.e., the suction and delivery ports) of hydraulic motor 40a, and open the wholly opened bypass passage 33 to fluid sump 82 through drain passage 34, thereby draining the fluid from kidney ports 62a and 62b to fluid sump 82.

When bypass operation arm 65a is disposed at closed valve position 73, bypass valve shaft 66 is disposed so as to slant horizontal bypass valve hole 66a from the axial direction of horizontal hole 33c of bypass passage 33, so that the outer peripheral surface of bypass valve shaft 66 shuts off horizontal hole 33c. In this way, closed bypass valve 71a cuts off bypass passage 33 so as to prevent fluid from bypassing between kidney ports 62a and 62b of hydraulic motor 40a.

A returning spring 85 is wound around bypass valve shaft 66 between bypass operation arm 65a and a top surface of upper housing part 46, so as to bias bypass operation arm 65a toward closed valve position 73. In this regard, a vertical retaining pin 86 fixedly projects upward from the top surface of upper housing part 46, and a vertical pushing pin 87 fixedly projects downward from bypass operation arm 65a. When bypass operation arm 65a is disposed at closed valve position 73, both end portions 85a and 85b of returning spring 85 pinches retaining pin 86 and pushing pin 87. When bypass operation arm 65a is moved to opened valve position 72, pushing pin 87 moves together with bypass operation arm 65a and pushes one end portion 85b of spring 85 away from the other end portion 85a retained by unmovable retaining pin 86, thereby causing the biasing force of returning spring 85.

A detent knob 67 projects downward from bypass operation arm 65a, and an upwardly opened detent recess 46b is formed on the top surface of upper housing part 46. When bypass operation arm 65a reaches opened valve position 72, detent knob 67 is engaged into detent recess 46b so as to retain bypass operation arm 65a at opened valve position 72 against the biasing force of returning spring 85 toward closed valve position 73.

Bypass valve 71a for hydraulic motor 40a is provided with an automatic reset mechanism 32, as shown in FIG. 5(b). In this regard, reset mechanism 32 utilizes hydraulic pressure in drain passage 34. When vehicle 1 travels with an opened bypass valve 71a, i.e., when bypass operation arm 65a is forgotten to be returned to closed valve position 73 before traveling of vehicle 1, opened bypass valve 71a keeps draining fluid to fluid sump 82, thereby increasing hydraulic pressure in drain passage 34, i.e., in drain hole 34a and the chamber of shaft hole 64 below bypass valve shaft 66. The increased hydraulic pressure pushes bypass valve shaft 66 and bypass operation arm 65a upward against the downward biasing force of spring 89. During the rising of bypass valve shaft 66 and bypass operation arm 65a, spring 89 is compressed between stationary boss 46a and rising flange 88. Finally, detent knob 67 rising together with bypass operation arm 65a is released from detent recess 46b, and bypass operation arm 65a naturally returns to closed valve position 73 due to the biasing force of returning spring 85.

After returning bypass operation arm 65a to closed valve position 73, bypass valve 71a is closed so as to shut off drain passage 34, thereby reducing hydraulic pressure in drain passage 34. Consequently, spring 88 uncompresses so as to lower bypassing valve shaft 66 to the initial height.

Motor shaft 41 is further extended from bearing 45 to the outside of the transaxle housing through gear chamber 10a, so as to be fixedly provided thereon with a cooling fan 35. In gear chamber 10a, a motor output gear 131 is spline-fitted on motor shaft 41, and integrally formed with a brake rotor 133 on an axial end portion thereof opposite to bearing 45. A vertical brake shaft 140 is journalled by upper and lower housing parts 46 and 47, and projects upward from upper housing part 46 so as to be fixedly provided thereon with a brake operation arm (not shown) operatively connected to brake pedal 15 through a wire or the like. Brake rotor 133 is disposed between brake shoes 134a and 134b. In this regard, brake shoe 134a is fitted to walls of housing parts 46 and 47, and brake shoe 134b is disposed between brake rotor 133 and brake shaft 140. A portion of brake shaft 140 facing brake shoe 134b is partly cut away so as to be sectionally semicircular, i.e., have a flat cam surface 140a facing brake shoe 134b.

When brake pedal 15 is depressed, brake shaft 140 is rotated so as to orient cam surface 140a slantwise from brake shoe 134b. Slanted cam surface 140a presses one end edge 140b thereof against brake shoe 134b toward brake shoe 134a, so as to pinch brake rotor 133 between brake shoes 134a and 134b, thereby braking motor shaft 41.

A counter shaft 139, parallel to motor shaft 41, is disposed in gear chamber 10a. A diametrically small and axially long gear 137 is relatively rotatably fitted on counter shaft 139, and a diametrically large gear 136 is relatively unrotatably fitted on one axial end portion of gear 137. Diametrically large gear 136 meshes with motor output gear 131, and diametrically small gear 137 meshes with a bull gear 121 of differential gear unit 120, thereby constituting deceleration gear train 135 interposed between motor shaft 41 and differential gear unit 120.

Differential gear unit 120 includes bull gear 121, a pinion shaft 122, a differential pinion 123 and differential side gears 124. Bull gear 121 meshes with diametrically small gear 137 of deceleration gear train 135, as mentioned above. Pinion shaft 122 projects centripetally from an inner peripheral portion of bull gear 121. Differential pinion 123 is relatively rotatably supported on pinion shaft 122 and meshes with differential side gears 124 fixed on proximal ends of respective front axles 12L and 12R, so as to differentially transmit rotation of bull gear 121 to axles 12L and 12R.

Differential gear unit 120 is provided with a differential locking mechanism 125. Differential locking mechanism 125 includes a slider 128 axially slidably fitted on one of axles 12L and 12R, and a lock pin 127 fixed to slider 128 and extended in parallel to axles 12L and 12R. Lock pin 127 is axially slidably fitted in differential side gear 124 fixed on the one of axles 12L and 12R. A shifter fork 126 is engaged onto slider 128 so as to be switchable between a differential position and a differential locking position. When shifter fork 126 is disposed at the differential position, lock pin 127 is disposed outside bull gear 121 so as to allow differential rotation of axles 12L and 12R. When shifter fork 126 is disposed at the differential locking position, lock pin 127 is engaged into bull gear 121 so as to rotatably integrate axles 12L and 12R with each other.

A hydraulic circuit 78 of vehicle 1 will be described with reference to FIG. 6. Hydraulic circuit 78 includes main HST closed circuit 36, which fluidly connects hydraulic motors 40a and 40b to hydraulic pump 30 in series so as to drive front axles 12L and 12R and rear axles 22L and 22R.

A charge pump 81 is disposed on pump shaft 31 so as to be driven by power of engine 5. Charge pump 81 sucks fluid from a fluid tank 100 and supplies the fluid to main HST closed circuit 36 through either charge (check) valve 81a or 81b.

Main HST closed circuit 36 includes a passage 36a interposed between hydraulic pump 30 and hydraulic motor 40a, a passage 36b interposed between hydraulic pump 30 and hydraulic motor 40b, and a passage 36c interposed between hydraulic motors 40a and 40b. In this regard, hydraulic fluid pipes are connected among pump housing 70 and the transaxle housings of front and rear transaxles 10 and 20, so as to constitute passages 36a, 36b and 36c. The pipes connected to port members 54a and 54b of front transaxle 10 serve as passages 36a and 36c. Rear transaxle 20 has similar port members, to which the pipes are connected so as to serve as passages 36b and 36c.

Figure 5:
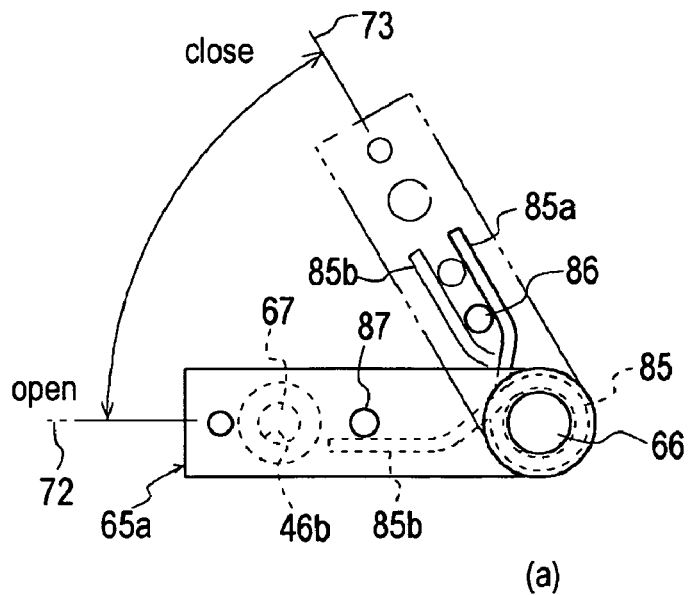
Figure 5:
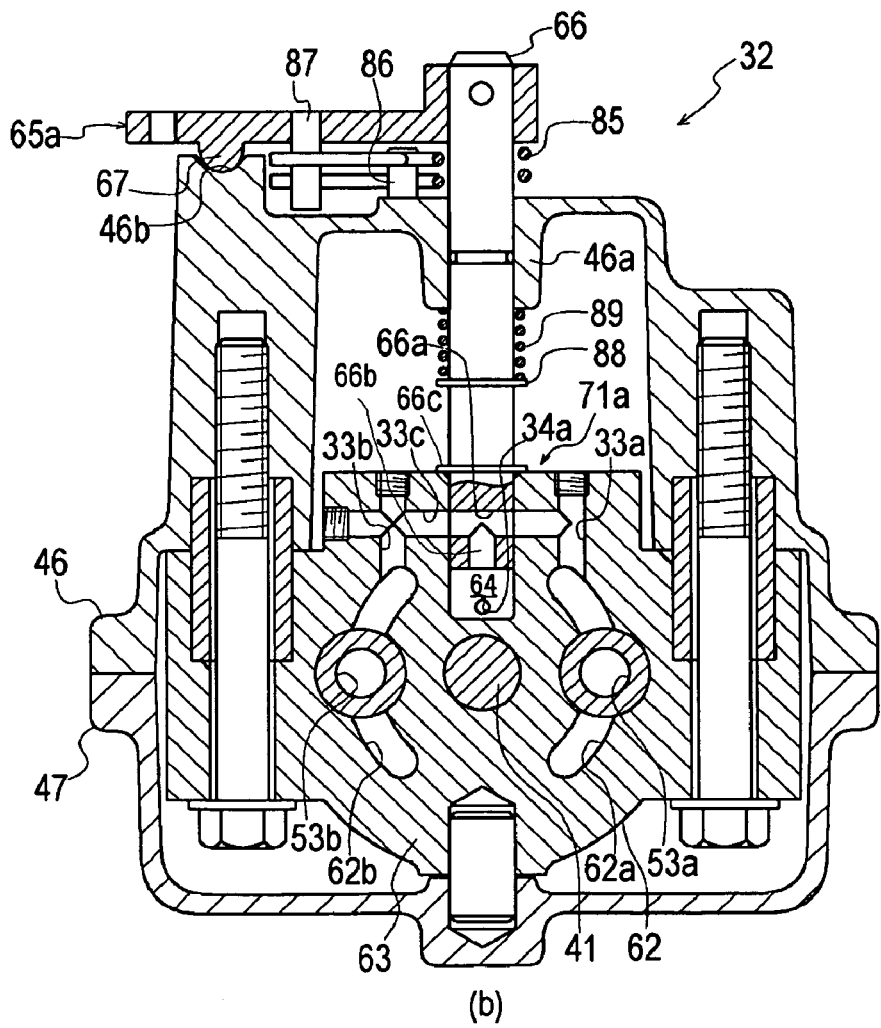

In front transaxle 10, bypass passage 33 including bypass valve 71a is interposed between passages 36a and 36c so as to bypass between suction and delivery ports (referring to FIG. 5(*b*), kidney ports 62a and 62b) of hydraulic motor 40a. In rear transaxle 20, a bypass passage 74 including a bypass valve 71b is interposed between passages 36b and 36c so as to bypass between suction and delivery ports of hydraulic motor 40b. In pump housing 70, a bypass passage 75 including a bypass valve 71c is interposed between passages 36a and 36b so as to bypass between suction and delivery ports of hydraulic pump 30.

Drain passage 34 is extended from bypass valve 71a and opened to a fluid sump 82 in the transaxle housing of front transaxle 10. A drain passage 76 is extended from bypass valve 71b and opened to a fluid sump 83 in the transaxle housing of rear transaxle 20. A drain passage 77 is extended from bypass valve 71c and opened to a fluid sump 84 in pump housing 70. Pipes are extended from pump housing 70 and the transaxle housings of front and rear transaxles 10 and 20, and collected as a passage 120 connected to fluid tank 100, thereby fluidly connecting fluid sumps 82, 83 and 84 to fluid tank 100.

Bypass valve 71a in front transaxle 10 is constructed as mentioned above. Bypass valve 71b in rear transaxle 20 and bypass valve 71c in pump housing 70 are constructed similar to bypass valve 71a. Incidentally, the above described bypass valve 71a is a rotary valve. However, each of bypass valves 71a, 71b and 71c may be any type valve if it can bypass between suction and delivery ports of each of hydraulic motor 40a, 40b and hydraulic pump 30. For example, an alternative bypass valve includes a slidable spool. An alternative bypass valve pushes a cylinder block away from a center section so as to be opened to a fluid sump. An alternative bypass valve uses a pair of check valves: one interposed between a suction port and a fluid sump; and the other interposed between a delivery port and the fluid sump. During bypassing, the bypass valve mechanically opens both the check valves simultaneously and evenly, so as to forcibly drain fluid from the suction and delivery ports to the fluid sump.

Similar to bypass operation arm 65a of bypass valve 71a, bypass valves 71b and 71c are provided with respective bypass operation arms 65b and 65c. Further, bypass operation lever 52 (see FIG. 1) interlocks with bypass operation arms 65a, 65b and 65c, so as to enable simultaneous operation of bypass valves 71a, 71b and 71c. Namely, bypass operation lever 52 is switchable between a closed valve position for simultaneously closing bypass valves 71a, 71b and 71c and an opened valve position for simultaneously opening bypass valves 71a, 71b and 71c.

Further, referring to FIGS. 4, 5(*a*) and 5(*b*), bypass valve 71a of hydraulic motor 40a is provided with the above-mentioned automatic reset mechanism 32 using hydraulic pressure in drain passage 34. Similarly, bypass valves 71b and 71c are provided with respective automatic reset mechanisms using hydraulic pressure in respective drain passages 76 and 77. Therefore, even if bypass operation lever 52 is forgotten to be returned to the closed valve position before traveling of vehicle 1, unclosed bypass valves 71a, 71b and 71c drain fluid to respective fluid sumps 82, 83 and 84, and increase hydraulic pressure in each of drain passages 34, 76 and 77 which releases each of bypass operation arms 65a, 65b and 65c from the corresponding opened valve position, and returns it to the corresponding closed valve position.

Figure 7:
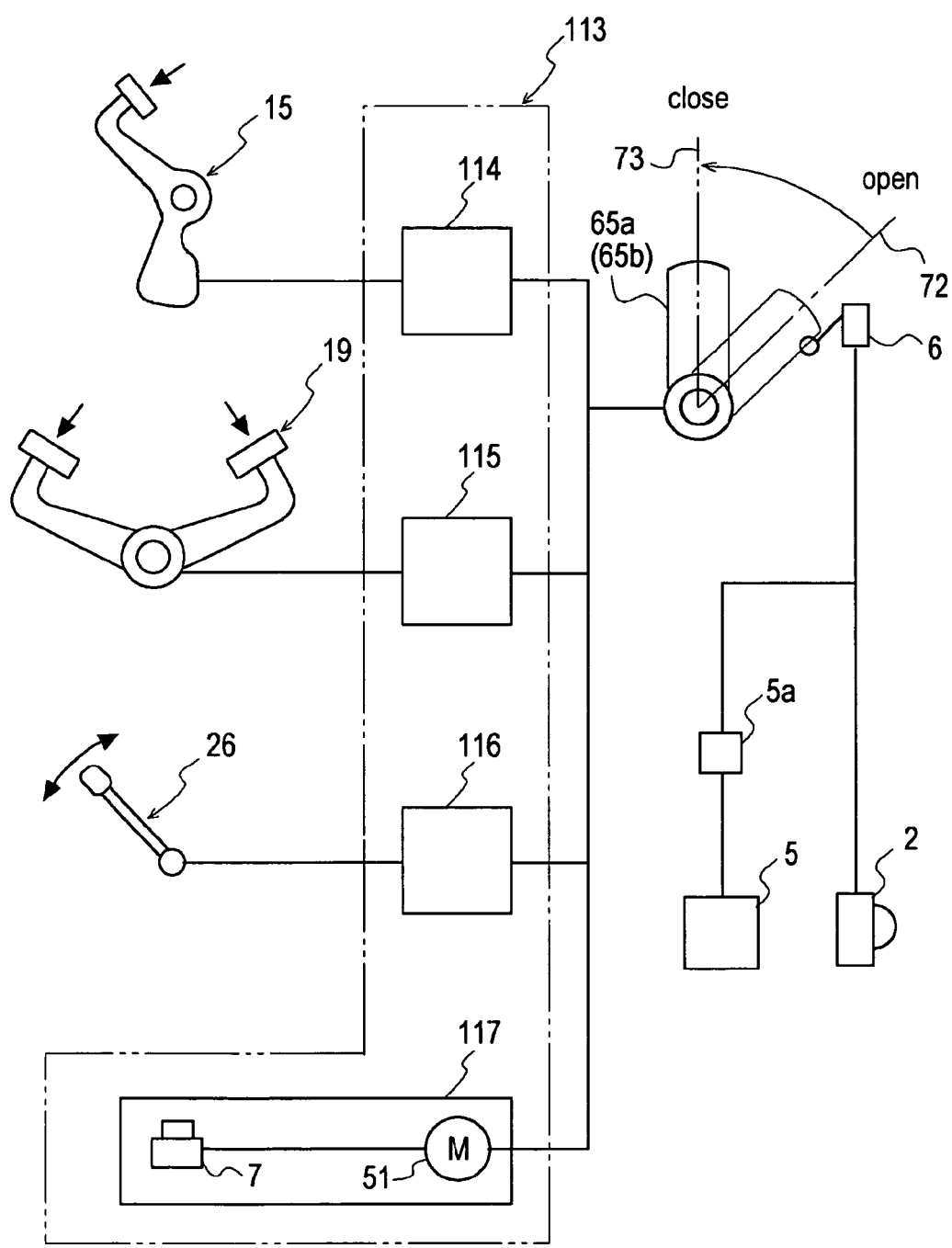
FIG. 7 is a systematic diagram of the reset mechanism.

Alternatively or additionally, vehicle 1 is provided with a reset system 113 for automatically closing unclosed bypass valve 71a or 71b in association with another (manual) operation, as shown in FIG. 7. FIG. 7 illustrates reset system 113 including reset mechanisms 114, 115, 116 and 117. However, at least one of reset mechanisms 114 to 117 can be enough for realizing reset system 113.

Each of reset mechanisms 114, 116 and 117 associates the resetting of bypass valves 71a and 71b with an operation required before starting of engine 5, i.e., depression of brake pedal 15, a clutching-off operation of mower unit 3 or an operator sitting on seat 9. Due to any one of reset mechanisms 114, 116 and 117, bypass valves 71a and 71b are surely closed before starting of engine 5. Reset mechanism 115 associates the resetting of bypass valves 71a and 71b with depression of speed changing pedal 19 for acceleration after starting of engine 5. Of course, each of reset mechanisms 114, 116 and 117 can also automatically close unclosed bypass valve 71a or 71b in association with depression of brake pedal 15, a clutch-off operation of mower unit 3 or an operator sitting on seat 9 even if bypass valve 71a or 71b remains open after starting of engine 5.

Reset mechanism 114 shown in FIGS. 7, 8 and 9 will be described. Reset mechanism 114 operatively connects brake pedal 15 to bypass operation arms 65a and 65b. Brake pedal 15 is operatively connected to the brakes (see FIG. 3) for braking respective hydraulic motors 40a and 40b. Brake pedal 15 is necessarily depressed before starting of engine 5. Brake pedal 15 is pivoted at a vertical intermediate portion thereof on a horizontal pivot 48, and provided on a top thereof with a pedal plate 15a and formed with an arm 15d opposite to pedal plate 15a with respect to pivot 48 (extended downward from pivot 48), so that, when pedal plate 15a of brake pedal 15 is depressed, the arm 15d is rotated rearward. The arm 15d of brake pedal 15 is formed with arcuate slots 15b and 15c disposed concentrically around pivot 48. A connection rod 103 is slidably fitted at a front end thereof into upper slot 15b, and pivotally connected at a rear end thereof to bypass operation arm 65a adjacent to bypass valve shaft 66.

A restriction rod 104 is pivotally connected at a front end thereof to a tip of bypass operation arm 65a opposite to bypass valve shaft 66. A stopper 107 includes a guide hole 107a through which restriction rod 104 is axially slidably passed, and provided on a rear end thereof with an engaging portion 104a, opposite to the tip of bypass operation arm 65a with respect to stopper 107. When bypass operation arm 65a is disposed at closed valve position 73, engaging portion 104a is disposed apart from stopper 107, so as not to prevent rotation of bypass operation arm 65a. When bypass operation arm 65a is moved to opened valve position 72, engaging portion 104a finally abuts against stopper 107 so as to define opened valve position 72 of bypass operation arm 65a.

Figure 8:
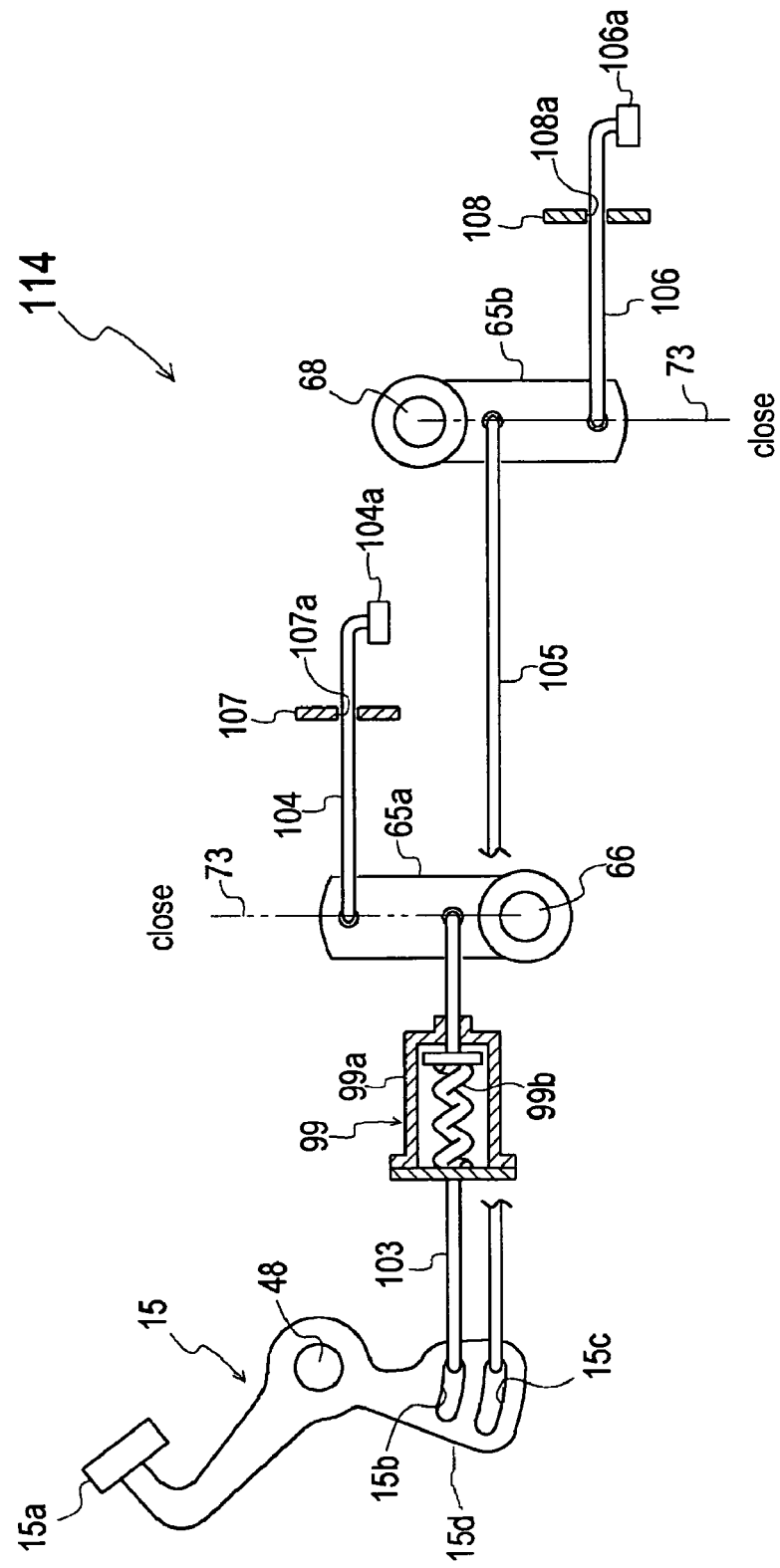
FIG. 8 is a structural view of a reset mechanism associated with a braking operation when both bypass valves of the respective front and rear transaxles are closed.
Figure 9:
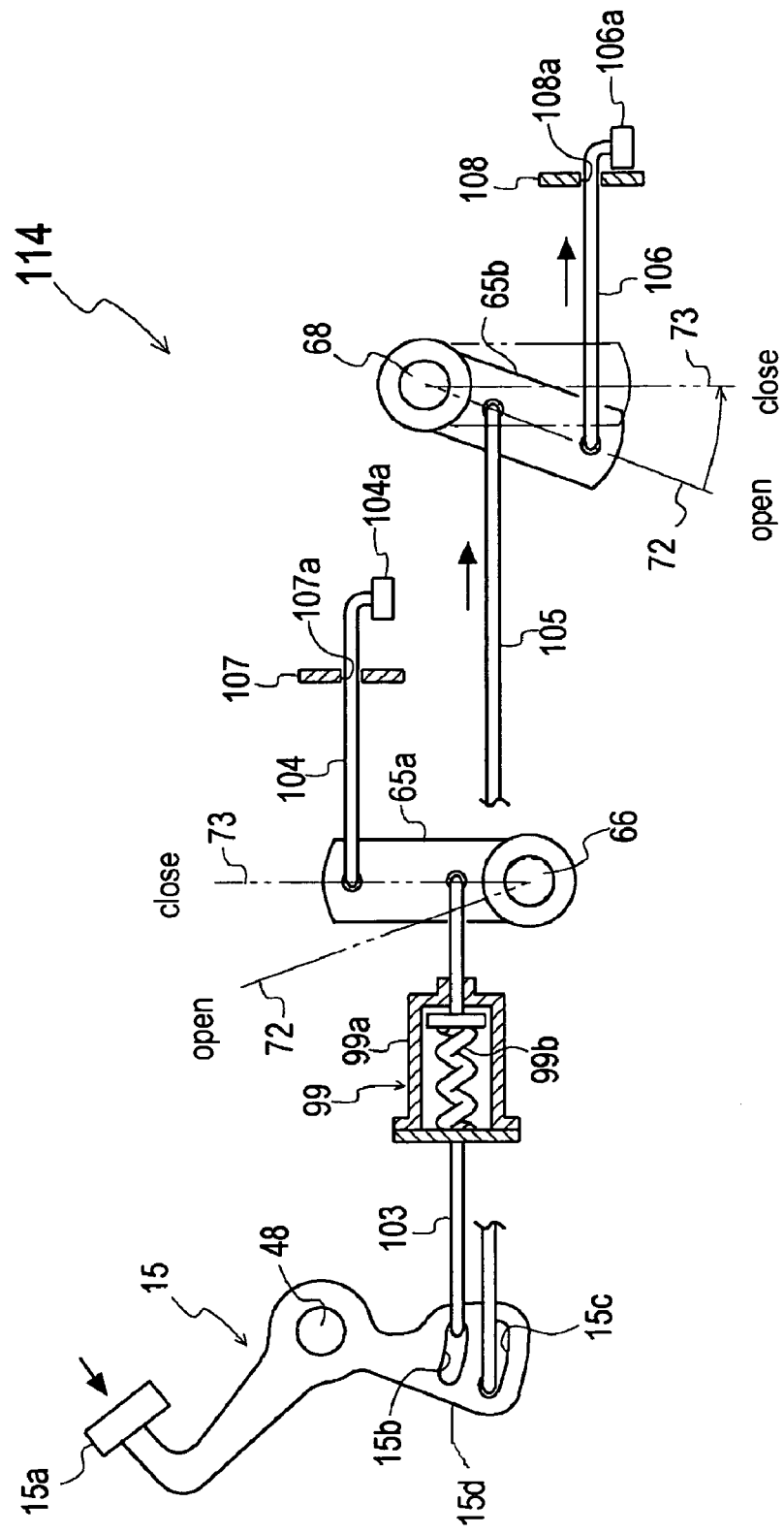
FIG. 9 is a structural view of the reset mechanism associated with a braking operation when one of the bypass valves is opened.

Referring to FIGS. 8 and 9, bypass operation arm 65a is disposed at closed valve position 73 and the front end of connection rod 103 is disposed at a rear end of slot 15b, so that connection rod 103 is kept stationary during the rearward movement of slot 15b by depression of pedal plate 15a of brake pedal 15, thereby keeping bypass operation arm 65a at closed valve position 73. If bypass operation arm 65a is disposed at opened valve position 72 (not shown), the front end of connection rod 103 is disposed at a front end of slot 15b, so that connection rod 103 is moved together with rearward movement of slot 15b by depression of pedal plate 15a of brake pedal 15 so as to forcibly rotating bypass operation arm 65a to closed valve position 73.

A shock absorber 99 is interposed in connection rod 103 so as to moderate axial movement of connection rod 103 caused by depression of pedal plate 15a of brake pedal 15. Shock absorber 99 includes a casing 99a which incorporates a compressed spring 99b interposed between divided front and rear portions of connection rod 103. Alternatively, a shock absorber 99 may be interposed in restriction rod 104 if it achieves the same purpose.

A connection rod 105 is slidably fitted at a front end thereof into lower slot 15c, and pivotally connected at a rear end thereof to bypass operation arm 65b adjacent to a bypass valve shaft 68 serving as bypass valve 71b (similar to bypass valve shaft 66 serving as bypass valve 71a). A restriction rod 106 is pivotally connected at a front end thereof to a tip of bypass operation arm 65b opposite to bypass valve shaft 68. A shock absorber may be interposed in connection rod 105 or restriction rod 106. A stopper 108 includes a guide hole 108a through which restriction rod 106 is axially slidably passed, and provided on a rear end thereof with an engaging portion 106a, opposite to the tip of bypass operation arm 65b with respect to stopper 108. When bypass operation arm 65b is disposed at closed valve position 73, engaging portion 106a is disposed apart from stopper 108, so as not to prevent rotation of bypass operation arm 65b. When bypass operation arm 65b is moved to opened valve position 72, engaging portion 106a finally abuts against stopper 108 so as to define opened valve position 72 of bypass operation arm 65b.

Referring to FIG. 8, bypass operation arm 65b is disposed at closed valve position 73 and the front end of connection rod 105 is disposed at a rear end of slot 15c, so that connection rod 105 is kept stationary during the rearward movement of slot 15c by depression of pedal plate 15a of brake pedal 15, thereby keeping bypass operation arm 65b at closed valve position 73. Referring to FIG. 9, bypass operation arm 65b is disposed at opened valve position 72. In this state, the front end of connection rod 105 is disposed at a front end of slot 15c. When pedal plate 15a of brake pedal 15 is depressed, connection rod 105 moves rearward together with the rearwardly moving slot 15c, thereby forcibly rotating bypass operation arm 65b from opened valve position 72 to closed valve position 73.

In this way, reset mechanism 114 forcibly closes any unclosed one of bypass valves 71a and 71b in association with the depression of brake pedal 15 required before starting of engine 5, so as to ensure proper traveling of vehicle 1.

Figure 10:
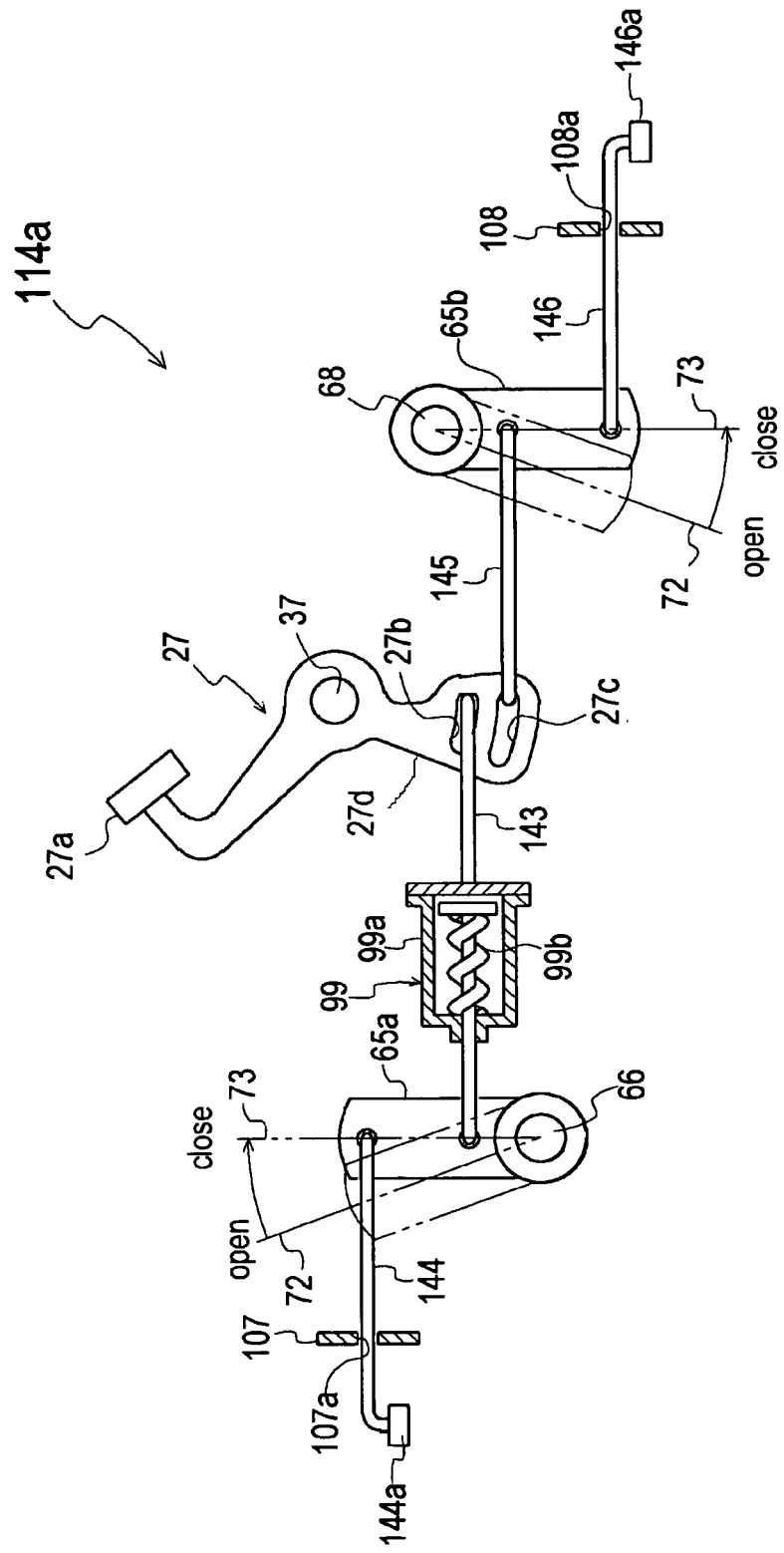
FIG. 10 is a structural view of a reset mechanism associated with an operation of a brake pedal disposed between the front and rear transaxles, when both the bypass valves of the respective front and rear transaxles are closed.

A brake pedal may be disposed between front and rear transaxles 10 and 20 in the fore-and-aft direction of a vehicle. A reset mechanism 114a shown in FIG. 10 is a rearrangement reset mechanism 114, such as to be adapted for a brake pedal 27 disposed between front and rear transaxles 10 and 20.

Brake pedal 27 is pivoted at a vertical intermediate portion thereof on a horizontal pivot 37, and provided on a top thereof with a pedal plate 27a and formed with an arm 27d opposite to pedal plate 27a with respect to pivot 37 (extended downward from pivot 37), so that, when pedal plate 27a of brake pedal 27 is depressed, the arm 27d is rotated rearward. The arm 27d of brake pedal 27 is formed with arcuate slots 27b and 27c disposed concentrically around pivot 37.

A connection rod 143 is slidably fitted at a rear end thereof into upper slot 27b, and pivotally connected at a front end thereof to bypass operation arm 65a adjacent to bypass valve shaft 66 serving as bypass valve 71a. A restriction rod 144 is pivotally connected at a rear end thereof to a tip of bypass operation arm 65a opposite to bypass valve shaft 66. Restriction rod 144 is axially slidably passed through guide hole 107a of stopper 107, and provided on a front end thereof with an engaging portion 144a, so as to define opened valve position 72 of bypass operation arm 65a, similar to fore-and-aft reversed restriction rod 104 with engaging portion 104a.

When bypass operation arm 65a is disposed at closed valve position 73 (as drawn in solid lines in FIG. 10), the rear end of connection rod 143 is disposed at a rear end of slot 27b, so that connection rod 143 is kept stationary during the rearward movement of slot 27b by depression of pedal plate 27a of brake pedal 27, thereby keeping bypass operation arm 65a at closed valve position 73. When bypass operation arm 65a is disposed at opened valve position 72 (as drawn in phantom lines in FIG. 10), the rear end of connection rod 143 is disposed at a front end of slot 27b, so that, when pedal plate 27a of brake pedal 27 is depressed, connection rod 143 is moved together with the rearward movement of slot 27b so as to forcibly rotate bypass operation arm 65a from opened valve position 72 to closed valve position 73.

A connection rod 145 is slidably fitted at a front end thereof into lower slot 27c, and pivotally connected at a rear end thereof to bypass operation arm 65b adjacent to bypass valve shaft 68 serving as bypass valve 71b. A restriction rod 146 is pivotally connected at a front end thereof to a tip of bypass operation arm 65b opposite to bypass valve shaft 68. Restriction rod 146 is axially slidably passed through guide hole 108a of stopper 108, and provided on a rear end thereof with an engaging portion 146a, so as to define opened valve position 72 of bypass operation arm 65b, similar to restriction rod 106 with engaging portion 106a.

When bypass operation arm 65b is disposed at closed valve position 73 (as drawn in solid lines in FIG. 10), the front end of connection rod 145 is disposed at a rear end of slot 27c, so that connection rod 145 is kept stationary during the rearward movement of slot 27c by depression of pedal plate 27a of brake pedal 27, thereby keeping bypass operation arm 65b at closed valve position 73. When bypass operation arm 65b is disposed at opened valve position 73 (as drawn in phantom lines in FIG. 10), the front end of connection rod 145 is disposed at a front end of slot 27c, so that, when pedal plate 27a of brake pedal 27 is depressed, connection rod 145 is moved together with the rearward movement of slot 27c so as to forcibly rotate bypass operation arm 65b from opened valve position 72 to closed valve position 73.

In FIG. 10, shock absorber 99 is interposed in connection rod 143. Alternatively or additionally, shock absorber 99 may be interposed in any of rods 144, 145 and 146.

Reset mechanism 115 shown in FIGS. 7 and 11 will be described. Speed changing pedal 19 is seesaw-like pivoted at its fore-and-aft intermediate boss portion 19c on a horizontal pivot 38. A front pedal plate 19a for changing forward traveling speed of the vehicle is provided on speed changing pedal 19 in front of pivot 38, and a rear pedal plate 19b for changing backward traveling speed of the vehicle is provided on speed changing pedal 19 behind pivot 38. Speed changing pedal 19 is operatively connected to a movable swash plate 30a of hydraulic pump 30 (see FIG. 6), so that movable swash plate 30a is rotated in one direction from a neutral position by depression of front pedal plate 19a so as to supply hydraulic motors 40a and 40b with fluid for forward traveling, and it is rotated in the other direction from the neutral position by depression of rear pedal plate 19b so as to supply hydraulic motors 40a and 40b with fluid for rearward traveling.

An upright reset arm 29 is disposed on a lateral side of speed changing pedal 19. Reset arm 29 is pivoted at a vertically intermediate portion thereof on a horizontal pivot 48 extended from front frame 11. Reset arm 29 is formed at a lower portion thereof below pivot 48 with arcuate slots 29b and 29c disposed concentrically around pivot 48. Reset arm 29 is formed at an upper portion thereof above pivot 48 with a rearwardly opened V-like shaped recess 29a which is deepest at a vertical intermediate portion thereof.

An arm 39 is extended forward from boss portion 19c and rotatably integral with speed changing pedal 19. A roller 39a is pivoted on a front end of arm 39. Roller 39a is rotatably fitted forward into recess 29a. A spring 49 is wound around pivot 48 and interposed between reset arm 29 and front frame 11 so as to bias reset arm 29 for engaging roller 39a into the deepest portion of recess 29a. Whether front pedal plate 19a or rear pedal plate 19b is depressed, arm 39 with roller 39a vertically moves so that roller 39a pushes the upper portion of reset arm 29 above pivot 48 forward, thereby rearwardly rotating the lower portion of reset arm 29 below pivot 48 (as an arrow in FIG. 11).

A connection rod 154 is interposed between slot 29b and bypass operation arm 65a, and a restriction rod 155 with an engaging portion 155a is connected through stopper 107 to bypass operation arm 65a, similar to connection rod 103 and restriction rod 104. A connection rod 156 is interposed between slot 29c and bypass operation arm 65b, and a restriction rod 157 with an engaging portion 157a is connected through stopper 108 to bypass operation arm 65b, similar to connection rod 105 and restriction rod 106. Therefore, when any of bypass operation arms 65a and 65b is disposed at opened valve position 72 and speed changing pedal 19 is depressed, connection rod 154 or 156 connected to bypass operation arm 65a or 65b disposed at opened valve position 72 is pushed together with rearward movement of corresponding slot 29b or 29c so as to forcibly rotate corresponding bypass operation arm 65a or 65b from opened valve position 72 to closed valve position 73.

In this way, reset mechanism 115 forcibly closes any unclosed one of bypass valves 71a and 71b in association with the depression of speed changing pedal 19 required for acceleration after starting of engine 5, so as to ensure proper traveling of vehicle 1.

Figure 11:
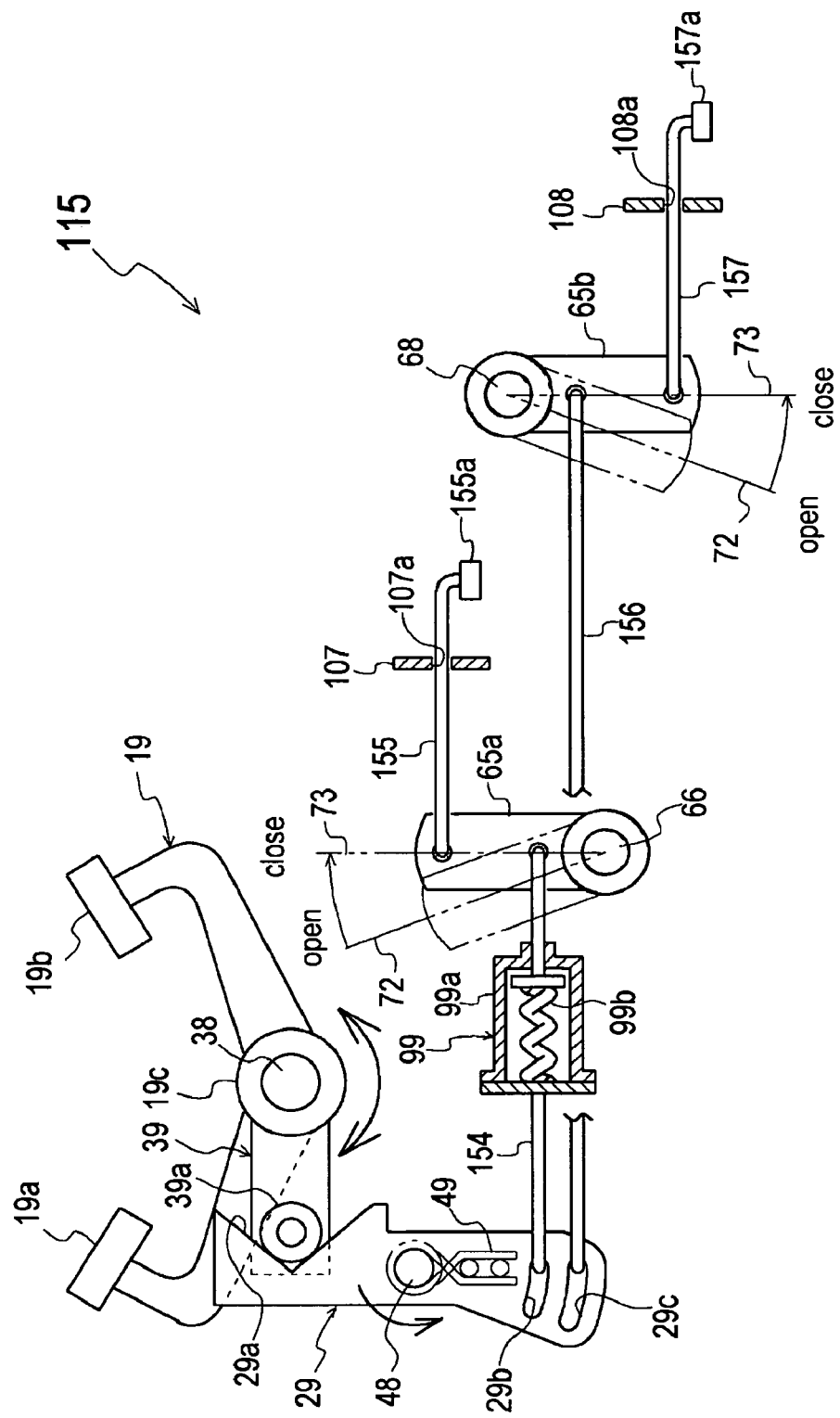
FIG. 11 is a structural view of a reset mechanism associated with a speed changing operation.

In FIG. 11, shock absorber 99 is interposed in connection rod 154. Alternatively or additionally, shock absorber 99 may be interposed in any of rods 155, 156 and 157.

Reset mechanism 116 will be described with reference to FIGS. 1 and 7. Mower clutch lever 26 provided on mower unit 3 is connected to bypass operation arms 65a and 65b through a linkage mechanism similar to those shown in FIGS. 8 to 10, so that any of bypass operation arms 65a and 65b disposed at opened valve position 72 is forcibly returned to closed valve position 73 by operation of mower clutch lever 26 for clutching off mower unit 3. Mower clutch lever 26 is necessarily operated for clutching off mower unit 3 before starting of engine 5. Therefore, all of bypass valves 71a and 71b are surely closed before starting of engine 5.

Reset mechanism 117 will be described with reference to FIGS. 1 and 7. As shown in FIG. 1, a pressure sensing switch among others serves as a seat switch 7 to be switched on when an operator sits on seat 9. When seat switch 7 is switched on (detects sitting of an operator on seat 9), an electric motor 51 is activated for forcibly rotating bypass operation arms 65a and 65b from respective opened valve positions 72 to respective closed valve positions 73. An operator necessarily sits on seat 9 before starting of engine 5. Therefore, all of bypass valves 71a and 71b are surely closed before starting of engine 5.

Each of reset mechanisms 114 to 117 illustrated in FIGS. 7 to 11 is connected to bypass operation arms 65a and 65b for operating bypass valves 71a and 71b of hydraulic motors 40a, 40b. Additionally, each of reset mechanisms 114 to 117 can also be connected to bypass operation arm 65c (see FIG. 6), so as to reset any of bypass valves 71a, 71b and 71c of hydraulic motors 40a, 40b and hydraulic pump 30.

Figure 12:
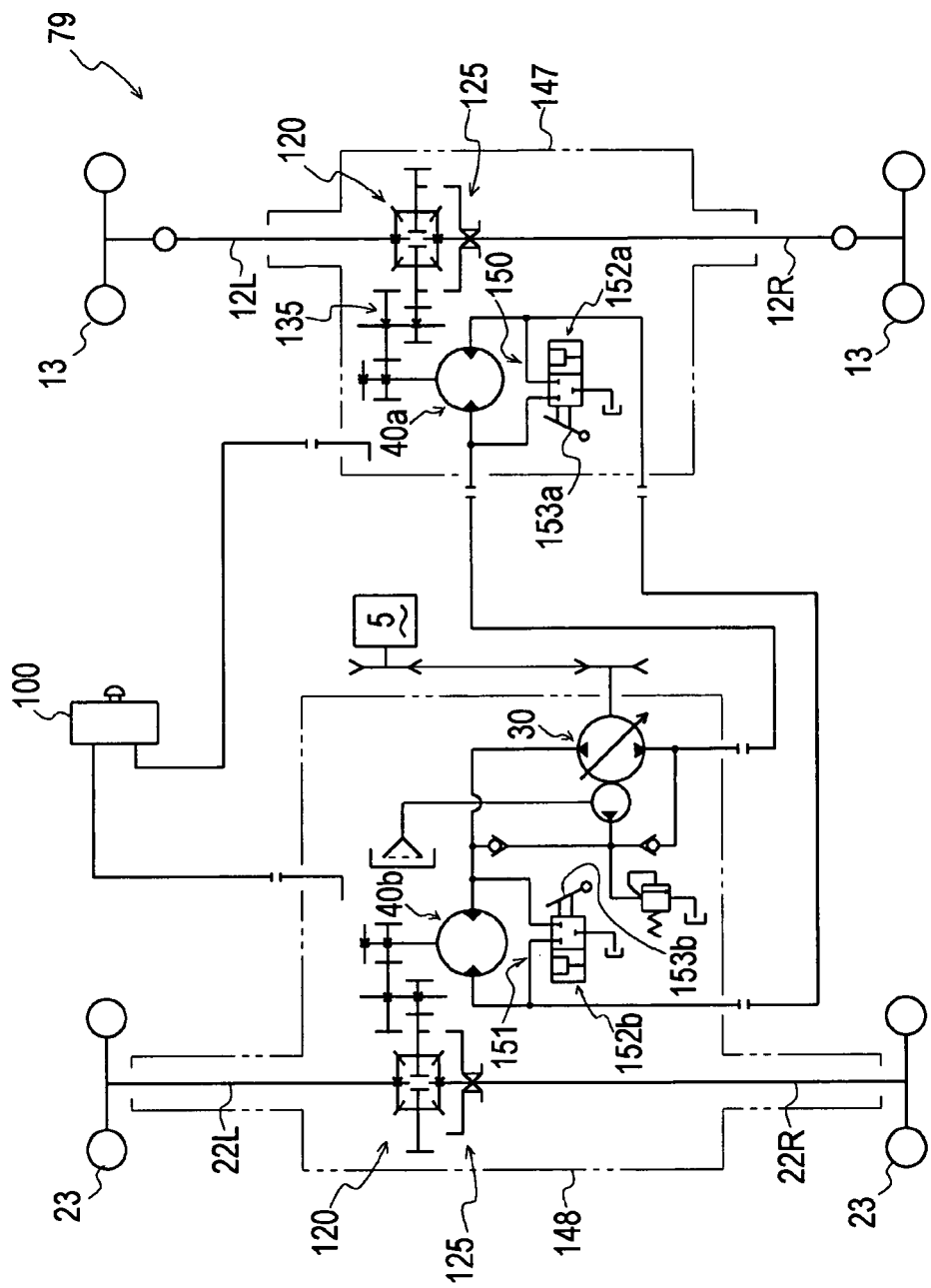
FIG. 12 is a structural diagram of a hydraulic circuit between the front and rear transaxles of the vehicle, wherein the rear transaxle incorporates a hydraulic pump and a hydraulic motor.
Figure 13:
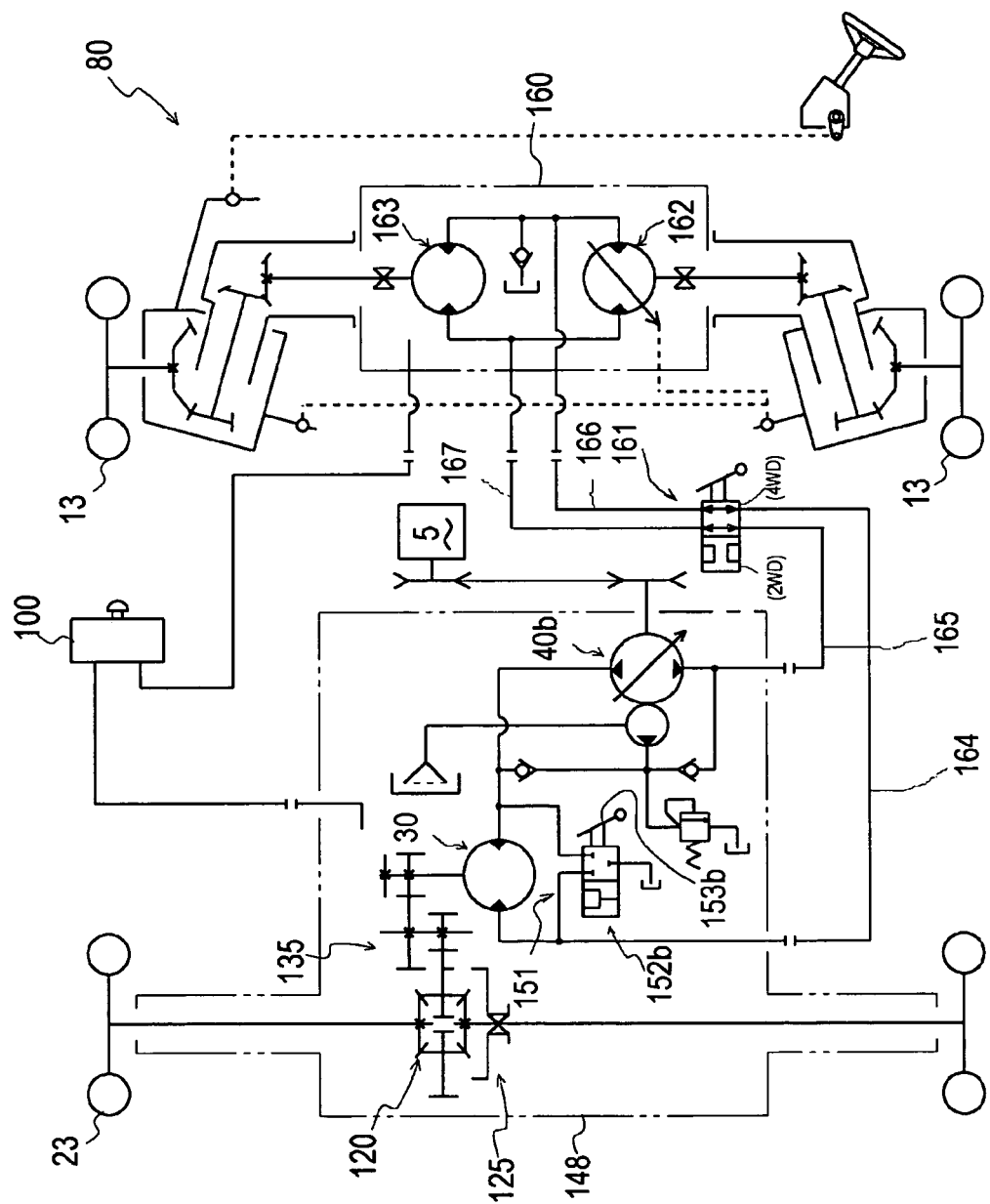
FIG. 13 is a structural diagram of a hydraulic circuit between the front and rear transaxles of the vehicle, wherein the rear transaxle incorporates a hydraulic pump and a hydraulic motor, and the front transaxle incorporates a pair of hydraulic motors fluidly connected to the hydraulic pump in parallel.

Any of reset mechanisms 32, 114 (114a), 115, 116 and 117 is adaptable to each of vehicle driving hydraulic circuits 79 and 80 shown in FIGS. 12 and 13. The same components of hydraulic circuits 79 and 80 as those in hydraulic circuit 78 are designated by the same reference numerals. Only distinctive points of hydraulic circuits 79 and 80 from hydraulic circuit 78 will be described.

Referring to hydraulic circuit 79 of FIG. 12, a front transaxle 147 incorporates hydraulic motor 40a for driving front axles 12L and 12R, and a rear transaxle 148 integrally incorporates hydraulic pump 30 and hydraulic motor 40b for driving rear axles 22L and 22R. Pipes are interposed between front transaxle 147 and rear transaxle 148 so as to fluidly connect hydraulic motors 40a and 40b to hydraulic pump 30 in series. In front transaxle 147, hydraulic motor 40a is provided with a bypass passage 150, a bypass valve 152a and a bypass operation arm 153a, similar to bypass passage 33, bypass valve 71a and bypass operation arm 65a. In rear transaxle 148, hydraulic motor 40b is provided with a bypass passage 151, a bypass valve 152b and a bypass operation arm 153b, similar to bypass passage 74, bypass valve 71b and bypass operation arm 65b. Hydraulic pump 30 is provided with no component for bypassing fluid between suction and delivery ports of hydraulic pump 30. Therefore, bypassing components in hydraulic circuit 79 are fewer than those of hydraulic circuit 78.

Each of bypass valves 152a and 152b may be provided with a reset mechanism similar to reset mechanism 32, so as to be forcibly closed according to increase of hydraulic pressure in the drain passage therefrom. Alternatively, any of reset mechanisms 114, 115, 116 and 117 may operatively connect to bypass operation arms 153a and 153b so as to automatically close any unclosed one of bypass valves 152a and 152b.

Referring to hydraulic circuit 80 of FIG. 13, the same rear transaxle 148 as that of hydraulic circuit 79 integrally incorporates hydraulic pump 30 and hydraulic motor 40b. A front transaxle 160 incorporates a pair of hydraulic motors 162 and 163 for driving respective left and right front axles 12L and 12R. Hydraulic motors 162 and 263 are fluidly connected to each other in parallel, so as to differentially drive front axles 12L and 12R without a mechanical differential unit. Front wheels 13 are steerably connected to respective front axles 12L and 12R. One of hydraulic motors 162 and 163 (in this embodiment, hydraulic motor 162) is changed in displacement according to turning of front wheels 13, so as to prevent drag of front wheels 13 or rear wheels 23 during turning of the vehicle.

A pair of pipes 164 and 165 are extended from rear transaxle 148, a pair of pipes 166 and 167 are extended from front transaxle 160, and a drive mode changing valve 161 is interposed between the pair of pipes 164 and 165 and the pipes 166 and 167. The drive mode changing valve 161 is switchable between a four-wheel drive mode position (4WD) and a two-wheel drive mode position (2WD). When drive mode changing valve 161 is disposed at the four-wheel drive mode position (4WD), pipe 164 is connected to pipe 166, and pipe 165 is connected to pipe 167, thereby fluidly connect hydraulic motors 162 and 163 to hydraulic pump 30 and motor 40b. When drive mode changing valve 161 is disposed at the two-wheel drive mode position (2WD), pipes 164 and 165 extended from rear transaxle 148 are connected to each other so as to make a closed HST circuit including hydraulic pump 30 and motor 40b without hydraulic motors 162 and 163, and pipes 166 and 167 extended from front transaxle 160 are connected to each other so as to make a closed circuit including hydraulic motors 162 and 163 for allowing rotation of axles 12L and 12R regardless of hydraulic driving power of fluid delivered from hydraulic pump 30.

In rear transaxle 148, hydraulic motor 40b is provided with bypass passage 151, bypass valve 152b and bypass operation arm 153b. Front transaxle 160 incorporates no bypass mechanism for hydraulic motors 162 and 163. When the vehicle is required to be hauled, drive mode changing valve 161 is disposed at the two-wheel drive mode position (2WD) so as to allow the rotatability of front axles 12L and 12R, thereby enabling the vehicle to be hauled.

Bypass valve 152b in rear transaxle 148 may be provided with a reset mechanism similar to reset mechanism 32, so as to be forcibly closed according to an increase of hydraulic pressure in the drain passage therefrom. Alternatively, any of reset mechanisms 114, 115, 116 and 117 may operatively connect to bypass operation arm 153b so as to automatically close unclosed bypass valve 152b.

It is further understood by those skilled in the art that the foregoing description is a preferred embodiment of the disclosed apparatus and that various changes and modifications may be made in the invention without departing from the scope thereof defined by the following claims.

What is claimed is:

1. A hydraulic transaxle comprising:
   an axle;
   a hydraulic pump driven by a prime mover;
   a hydraulic motor fluidly connected to the hydraulic pump so as to drive the axle;
   a bypass valve to be opened for bypassing fluid between suction and delivery ports of the hydraulic motor;
   a bypass operation device for selectively opening or closing the bypass valve; and
   a reset mechanism operatively connected to the bypass operation device so as to automatically close the bypass valve when the bypass valve is not closed,
   wherein the bypass operation device is configured to be operatively connected to a brake pedal provided on a vehicle equipped with the hydraulic transaxle so that the bypass operation device is operated by depressing the brake pedal so as to make the reset mechanism close the bypass valve.

2. The hydraulic transaxle according to claim 1, further comprising:
   a warning device for warning when it is detected that the bypass valve is opened.

3. A hydraulic transaxle comprising:
   an axle;
   a hydraulic pump driven by a prime mover;
   a hydraulic motor fluidly connected to the hydraulic pump so as to drive the axle;
   a bypass valve to be opened for bypassing fluid between suction and delivery ports of the hydraulic motor;
   a bypass operation device for selectively opening or closing the bypass valve; and
   a reset mechanism operatively connected to the bypass operation device so as to automatically close the bypass valve when the bypass valve is not closed,
   wherein the reset mechanism is activated to close the unclosed bypass valve according to an operation required for starting the prime mover.

4. A hydraulic transaxle comprising:
   an axle;
   a hydraulic pump driven by a prime mover;
   a hydraulic motor fluidly connected to the hydraulic pump so as to drive the axle;
   a bypass valve to be opened for bypassing fluid between suction and delivery ports of the hydraulic motor;
   a bypass operation device for selectively opening or closing the bypass valve;
   a reset mechanism operatively connected to the bypass operation device so as to automatically close the bypass valve when the bypass valve is not closed; and
   a drain passage connected to the bypass valve, wherein the reset mechanism is activated so as to close the unclosed bypass valve according to an increase of hydraulic pressure in the drain passage.

5. A hydraulically driven vehicle comprising:
   a plurality of axles;
   a prime mover;
   a hydraulic pump driven by the prime mover;
   a plurality of hydraulic motors fluidly connected to the hydraulic pump so as to drive the respective axles;
   a plurality of bypass valves each of which is to be opened for bypassing fluid between suction and delivery ports of each of the hydraulic motors;
   a plurality of bypass operation devices for selectively opening or closing the respective bypass valves;
   a reset mechanism operatively connected to the bypass operation devices so as to automatically close any unclosed one of the bypass valves; and
   a brake pedal, wherein the bypass operation device is operatively connected to the brake pedal so that the bypass operation device is operated by depressing the brake pedal so as to make the reset mechanism close the bypass valve.

6. The hydraulically driven vehicle according to claim 5, further comprising:
   a warning device for warning when it is detected that any of the bypass valves is opened.

7. A hydraulically driven vehicle comprising:
   a plurality of axles;
   a prime mover;
   a hydraulic pump driven by the prime mover;
   a plurality of hydraulic motors fluidly connected to the hydraulic pump so as to drive the respective axles;
   a plurality of bypass valves each of which is to be opened for bypassing fluid between suction and delivery ports of each of the hydraulic motors;
   a plurality of bypass operation devices for selectively opening or closing the respective bypass valves; and
   a reset mechanism operatively connected to the bypass operation devices so as to automatically close any unclosed one of the bypass valves,
   wherein the reset mechanism is activated so as to close any unclosed one of the bypass valves according to an operation required for starting the prime mover.

8. A hydraulically driven vehicle comprising:
   a plurality of axles;
   a prime mover;
   a hydraulic pump driven by the prime mover;
   a plurality of hydraulic motors fluidly connected to the hydraulic pump so as to drive the respective axles;
   a plurality of bypass valves each of which is to be opened for bypassing fluid between suction and delivery ports of each of the hydraulic motors;
   a plurality of bypass operation devices for selectively opening or closing the respective bypass valves;
   a reset mechanism operatively connected to the bypass operation devices so as to automatically close any unclosed one of the bypass valves; and
   drain passages connected to the respective bypass valves, wherein the reset mechanism is activated so as to close any unclosed one of the bypass valves according to an increase of hydraulic pressure in any of the drain passages.

* * * * *